(12) United States Patent
Tabata et al.

(10) Patent No.: US 9,041,973 B2
(45) Date of Patent: May 26, 2015

(54) SUPPORT SYSTEM, CONTROL DEVICE, IMAGE FORMING APPARATUS, AND SUPPORT METHOD UTILIZING CARDS ON WHICH WRITTEN INFORMATION IS PRINTED

(71) Applicant: KONICA MINOLTA, INC., Tokyo (JP)

(72) Inventors: Eiji Tabata, Ibaraka (JP); Toshihito Kobayashi, Toyokawa (JP); Sayaka Morita, Gamagori (JP); Masayasu Haga, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/262,572

(22) Filed: Apr. 25, 2014

(65) Prior Publication Data

US 2014/0320870 A1 Oct. 30, 2014

(30) Foreign Application Priority Data

Apr. 26, 2013 (JP) ................. 2013-093642

(51) Int. Cl.
G06K 15/10 (2006.01)
G06K 15/02 (2006.01)
G03B 21/00 (2006.01)
G06Q 10/10 (2012.01)
H04N 7/15 (2006.01)

(52) U.S. Cl.
CPC .............. *G06K 15/021* (2013.01); *G03B 21/00* (2013.01); *G06Q 10/101* (2013.01); *H04N 7/15* (2013.01)

(58) Field of Classification Search
CPC .......... H04N 7/15; H04N 7/142; H04N 7/147
USPC ......... 358/1.5, 1.15; 348/14.08, 14.09, 14.01, 348/E7.079, E7.081, E7.087; 709/201; 715/805

See application file for complete search history.

(56) References Cited

U.S. PATENT DOCUMENTS

| 4,727,431 A | 2/1988 | Nakamura et al. |
| 2005/0180631 A1* | 8/2005 | Zhang et al. .................. 382/173 |

(Continued)

FOREIGN PATENT DOCUMENTS

| JP | 61057175 A | 3/1986 |
| JP | 06-261317 A | 9/1994 |

(Continued)

OTHER PUBLICATIONS

Japanese Office Action dated Feb. 3, 2015, issued in counterpart Japanese Application No. 2013-093642.

*Primary Examiner* — Jacky X Zheng
(74) *Attorney, Agent, or Firm* — Holtz, Holtz, Goodman & Chick PC

(57) ABSTRACT

Having specified written information on a first card newly placed at a base A which is a first workspace and the position where the first card is placed, a PC (100A) which is a control device at base A stores, in a memory, the written information and the position where the first card is placed as card information. A PC (100B) connected to this PC instructs a printing device (200B) to print a second card based on the specified written information. The PC (100B) presents the position where the second card is to be placed at a base B which is a second workspace based on the specified position where the first card is placed.

24 Claims, 10 Drawing Sheets

(56) References Cited

U.S. PATENT DOCUMENTS

2010/0188557 A1\* 7/2010 Tan et al. .................. 348/342
2011/0199636 A1\* 8/2011 Katsuda .................. 358/1.15

FOREIGN PATENT DOCUMENTS

| JP | 2010231369 A | 10/2010 |
| JP | 2012248063 A | 12/2012 |

\* cited by examiner

SUPPORT SYSTEM, CONTROL DEVICE, IMAGE FORMING APPARATUS, AND SUPPORT METHOD UTILIZING CARDS ON WHICH WRITTEN INFORMATION IS PRINTED

This application is based on Japanese Patent Application No. 2013-093642 filed with the Japan Patent Office on Apr. 26, 2013, the entire content of which is hereby incorporated by reference.

BACKGROUND OF THE INVENTION

1. Field of the Invention

This invention relates to a support system, a control device, an image forming apparatus, and a support method, and particularly relates to a support system that supports an idea creation activity, a control device, an image forming apparatus, and a support method.

2. Description of the Related Art

In an idea creation activity, pieces of paper (cards), such as repositionable notes, are used as a medium for respective participants to write down, share and analyze their ideas. That is, in the idea creation activity, a plurality of participants each write down his/her idea on a card for presentation to others, and analyzes the presented ideas utilizing an analytical method, such as a KJ method or a framework to attempt to derive a new idea. In order to analyze ideas, initially presented ideas are reviewed from various angles to try to find out new aspects.

In this activity, a card is advantageous in that everyone can easily write down his/her idea thereon without any special technique, and can easily place (stick) the card at any position and change the position. Digital tools do not have such an advantage. Therefore, cards made of paper, such as repositionable notes, are often used for the idea creation activity.

There is a demand for conducting such an idea creation activity by a plurality of persons who are in a plurality of remote bases. In that case, it is conceivable to conduct an idea creation activity by providing each party with the other party's video as if participants who are at remote sites are seated around the same workspace, through use of a video system as disclosed in Japanese Laid-Open Patent Publication No. 6-261317, for example.

However, in the case of using the video system disclosed in Japanese Laid-Open Patent Publication No. 6-261317, participants can only check the idea creation activity at a remote place with video, and cannot conduct an idea creation activity by manipulating an actual card, such as changing the position of the card used at the remote place or additionally writing something on the card. Therefore, a problem arises in that togetherness among a plurality of participants in an idea creation activity is missing, which may interfere with an active idea creation activity.

SUMMARY OF THE INVENTION

The present invention was made in view of such a problem, and has an object to provide a support system that can support an idea creation activity conducted by a plurality of persons who are at a plurality of remote bases, a control device, an image forming apparatus, and a support method.

According to an aspect of the present invention, the support system is a system for supporting an idea creation activity, including a printing device, and a control device electrically connected to the printing device. The control device includes a specification unit configured to specify written information on a first card newly placed on a first workspace and a position where the first card is placed, a storage unit configured to store the written information on the first card as specified and the position where the first card is placed as specified, as card information, a control unit configured to cause the printing device to print a second card based on the written information as specified, and a presentation unit configured to present a position where the second card is to be placed on a second workspace based on the position where the first card is placed as specified.

According to another aspect of the present invention, the control device is a control device for controlling support of an idea creation activity, including a specification unit configured to specify written information on a first card newly placed on a first workspace and a position where the first card is placed, a storage unit configured to store the written information on the first card as specified and the position where the first card is placed as specified, as card information, a control unit configured to cause a printing device connected to the control device to print a second card based on the written information as specified, and a presentation unit configured to present a position where the second card is to be placed on a second workspace based on the position where the first card is placed as specified.

According to still another aspect of the present invention, the image forming apparatus includes the above-described control device.

According to yet another aspect of the present invention, a non-transitory computer-readable storage medium stores a control program for causing a controller of a computer to perform processing for supporting an idea creation activity. The program causes the controller to perform specifying written information on a first card newly placed on a first workspace and a position where the first card is placed, storing the written information on the first card as specified and the position where the first card is placed as specified, as card information, instructing a printing device connected to the computer to print a second card based on the written information as specified, and presenting a position where the second card is to be placed on a second workspace based on the position where the first card is placed as specified.

According to still another aspect of the present invention, the support method is a method for supporting an idea creation activity in a control device, including specifying written information on a first card newly placed on a first workspace and a position where the first card is placed, storing the written information on the first card as specified and the position where the first card is placed as specified, as card information, instructing a printing device connected to the control device to print a second card based on the written information as specified, and presenting a position where the second card is to be placed on a second workspace based on the position where the first card is placed as specified.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
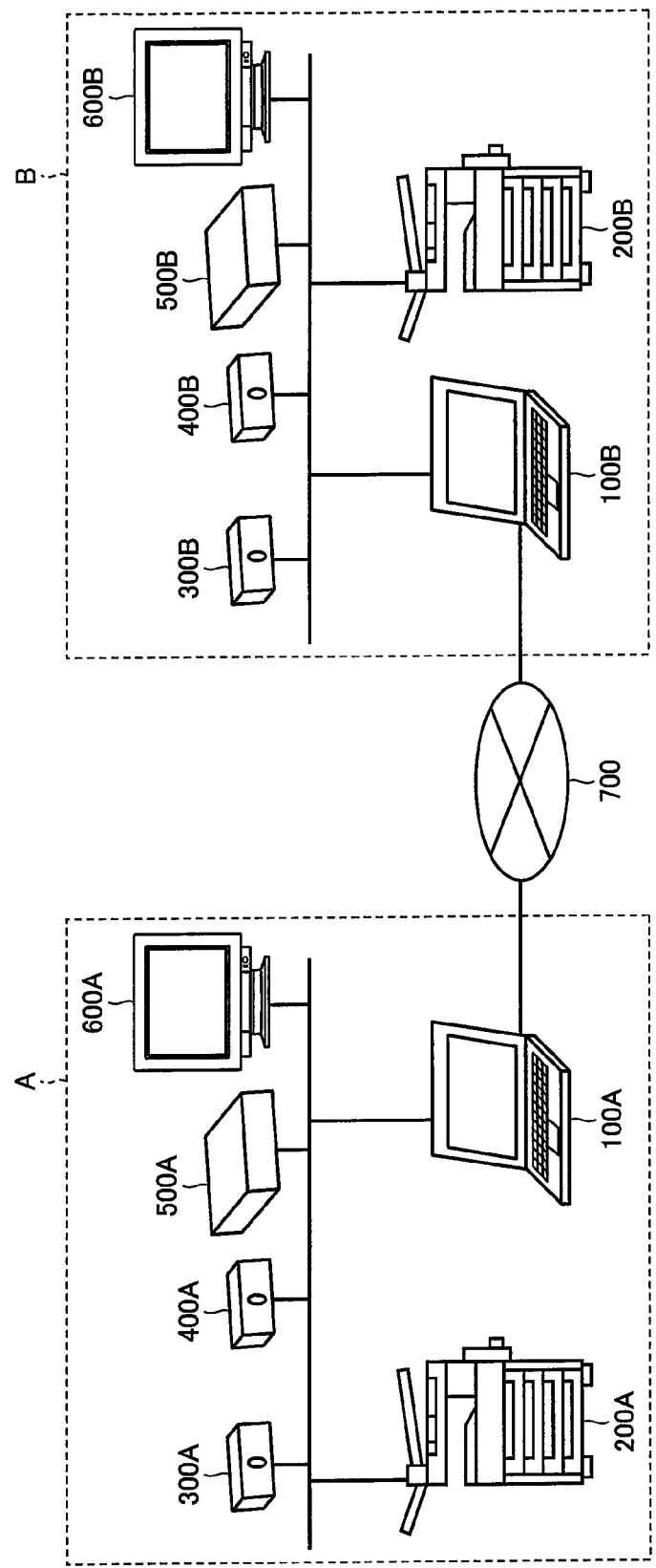
FIG. 1 shows a specific example of a configuration of a support system according to an embodiment.

An embodiment of the present invention will be described below with reference to the drawings. In the following description, the same parts and components have the same reference characters allotted. They also have the same names and functions. Therefore, description thereof will not be repeated.

<System Configuration>

FIG. 1 shows a specific example of a configuration of a support system according to the present embodiment. Referring to FIG. 1, the support system at least includes a PC (Personal Computer) 100 which is a control device, and a MFP (Multi-Functional Peripheral) 200 which is an example printing device.

As an example, the present support system supports an idea creation activity conducted by a plurality of persons who are at two bases, a base A (e.g., Tokyo) and a base B (e.g., Osaka), as a plurality of bases. Therefore, as an example, PC 100 includes PCs 100A and 100B placed at bases A and B, respectively, and MFP 200 includes MFPs 200A and 200B placed at bases A and B, respectively.

Preferably, the support system further includes cameras 300, 400, a projector 500 and a monitor 600. A plurality of them (two each at A and B) shall be included to be placed at bases A and B, respectively.

PC 100 which is a control device is electrically connected to MFP 200, cameras 300, 400, projector 500, and monitor 600 by wire or wirelessly, and controls their operations. PCs 100A and 100B are electrically connected to each other through a communication network 700, such as the Internet, for example, and can communicate with each other.

It is noted that the configuration of FIG. 1 is merely an example, and the support system is not limited to this configuration. For example, the control device may be one PC 100 placed at any base or at a position distant from any base. Alternatively, each of MFPs 200A and 200B may function as the control device.

Moreover, the control device is not limited to PC, but may be a mobile terminal, such as a mobile phone or a so-called smart phone, or may be included in MFP 200. The printing device is not limited to MFP which is a compound machine, but may be any other device at least having a printer function. The same applies to projector 500 and monitor 600.

<Device Configuration>

Every device included in the present support system can be implemented by a typical device. That is, PC 100 may be a typical PC, and MFP 200 may be a typical MFP.

Figure 2:
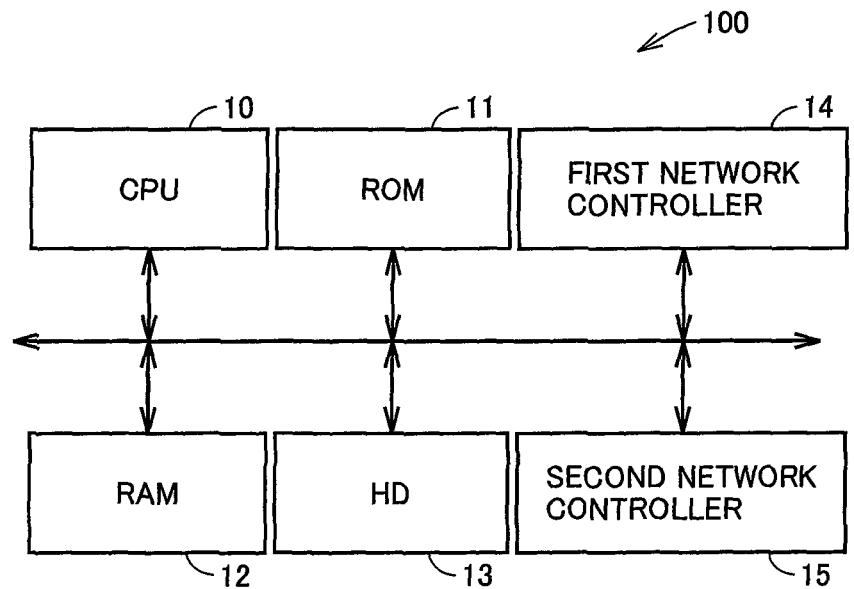
FIG. 2 is a block diagram showing a specific example of a configuration of PC (Personal Computer) included in the support system.

FIG. 2 is a block diagram showing a specific example of a configuration of PC 100, and shows the configuration of a typical PC as an example. That is, referring to FIG. 2, PC 100 includes a CPU (Central Processing Unit) 10 which is an arithmetic unit for overall control, a ROM (Read Only Memory) 11, a RAM (Random Access Memory) 12 and a HD (Hard Disk) 13, each of which functions as a memory, a first network controller 14 for controlling communications among MFP 200, cameras 300, 400, projector 500, and monitor 600, and a second network controller 15 for controlling communications among PCs 100.

Figure 3:
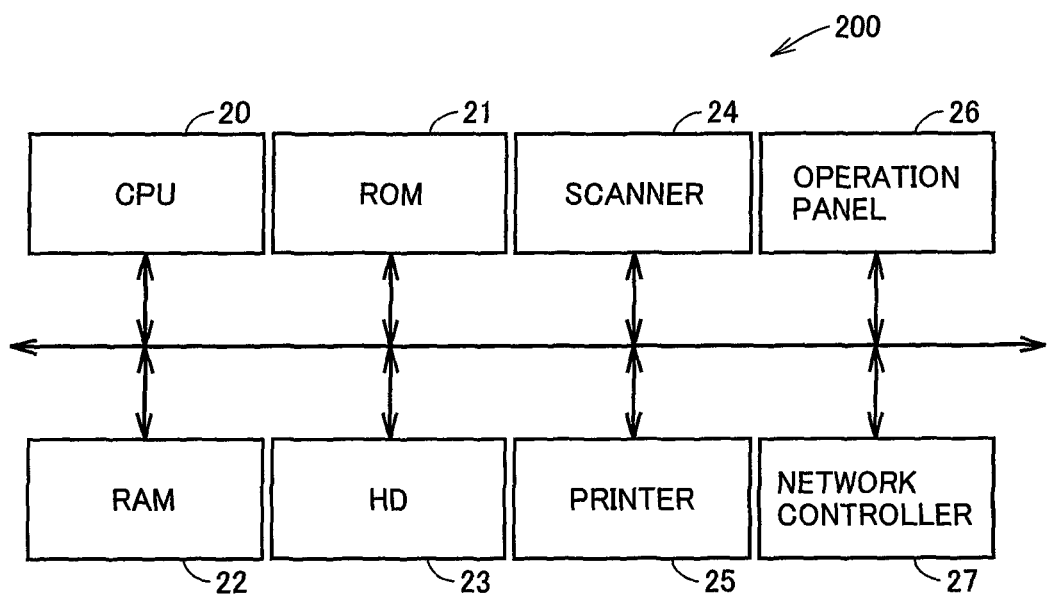
FIG. 3 is a block diagram showing a specific example of a configuration of MFP (Multi-Functional Peripheral) included in the support system.

FIG. 3 is a block diagram showing a specific example of a configuration of MFP 200, and shows the configuration of a typical MFP as an example. That is, referring to FIG. 3, MFP 200 includes a CPU 20 which is an arithmetic unit for overall control, a ROM 21, a RAM 22 and a HD 23, each of which functions as a memory, a scanner 24, a printer 25, an operation panel 26, and a network controller 27 for controlling communications with PC 100.

<Outline of Operation>

Figure 4:
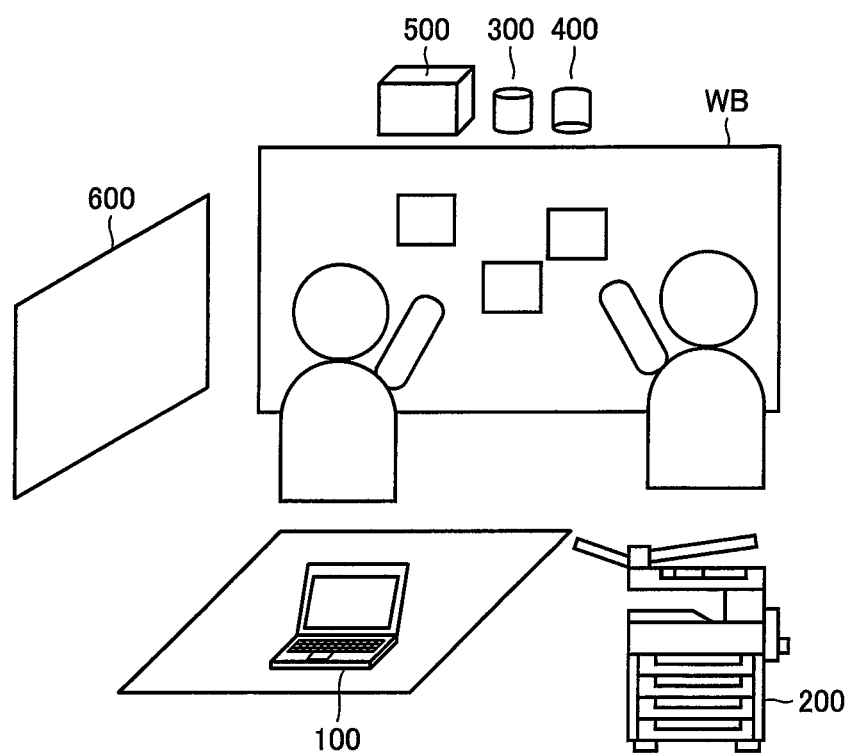
FIG. 4 illustrates a specific example of an arrangement of the support system.

FIG. 4 illustrates a specific example of an arrangement of the present support system. FIG. 4 illustrates an example arrangement at one of above-described bases A and B. Referring to FIG. 4, a white board (WB1, WB2) used as a working surface is provided at each base as an example workspace. Camera 300 is arranged such that its image capturing range includes the space between each of white boards WB1, WB2 and a user standing in front thereof. Camera 400 is arranged such that its image capturing range includes each of white boards WB1 and WB2. At the respective bases, projectors 500A, 500B are positioned and oriented so as to be capable of projecting images on white boards WB1, WB2 to be arranged, respectively.

In addition, a working table or the like may be provided at each base, and PC 100 may be placed thereon. MFP 200 may be placed in proximity thereto, and monitor 600 may be placed on a lateral side thereof.

It is noted that the workspace may be any space that has a working surface on which a repositionable note can be arranged (placed or attached). The working surface may not necessarily be a flat surface. It may be uneven, curved, or provided with holes.

A user participating in an idea creation activity at each base writes down an idea on a repositionable note as an example of a card. The user approaches white board WB and attaches the repositionable note on which the idea has been written to white board WB. The repositionable note attached to white board WB provides other participants with an idea by a written image (characters, figures, etc.) being visible, and indicates classification, ranking, and the like by the attached position (arrangement).

In the idea creation activity, an operation of attaching a new repositionable note to white board WB and an operation of moving an already attached repositionable note are performed. The operation of moving a repositionable note is divided into an operation of removing an already attached repositionable note from white board WB and an operation of attaching the removed repositionable note at another position. It is noted that, usually in an idea creation activity, participating users exchange ideas actively and discuss those ideas from various aspects, and therefore, there are few cases where presented ideas are withdrawn. Examples of the operation of withdrawing a once presented idea include an operation of moving an already attached repositionable note into a region on white board WB where ideas to be withdrawn are attached. Therefore, it is assumed that, in the idea creation activity supported by the present support system, the above-described two operations, the operation of attaching a new repositionable note to white board WB and the operation of moving an already attached repositionable note are performed as described above.

When a user performs the operation of attaching a repositionable note to white board WB, PC 100 obtains a captured image obtained with camera 400 whose image capturing range includes white board WB. PC 100 analyzes the captured image to specify the newly attached repositionable note and specify a written image thereon as written information. PC 100 also specifies the attached position (e.g., coordinates) as positional information.

Figure 5:
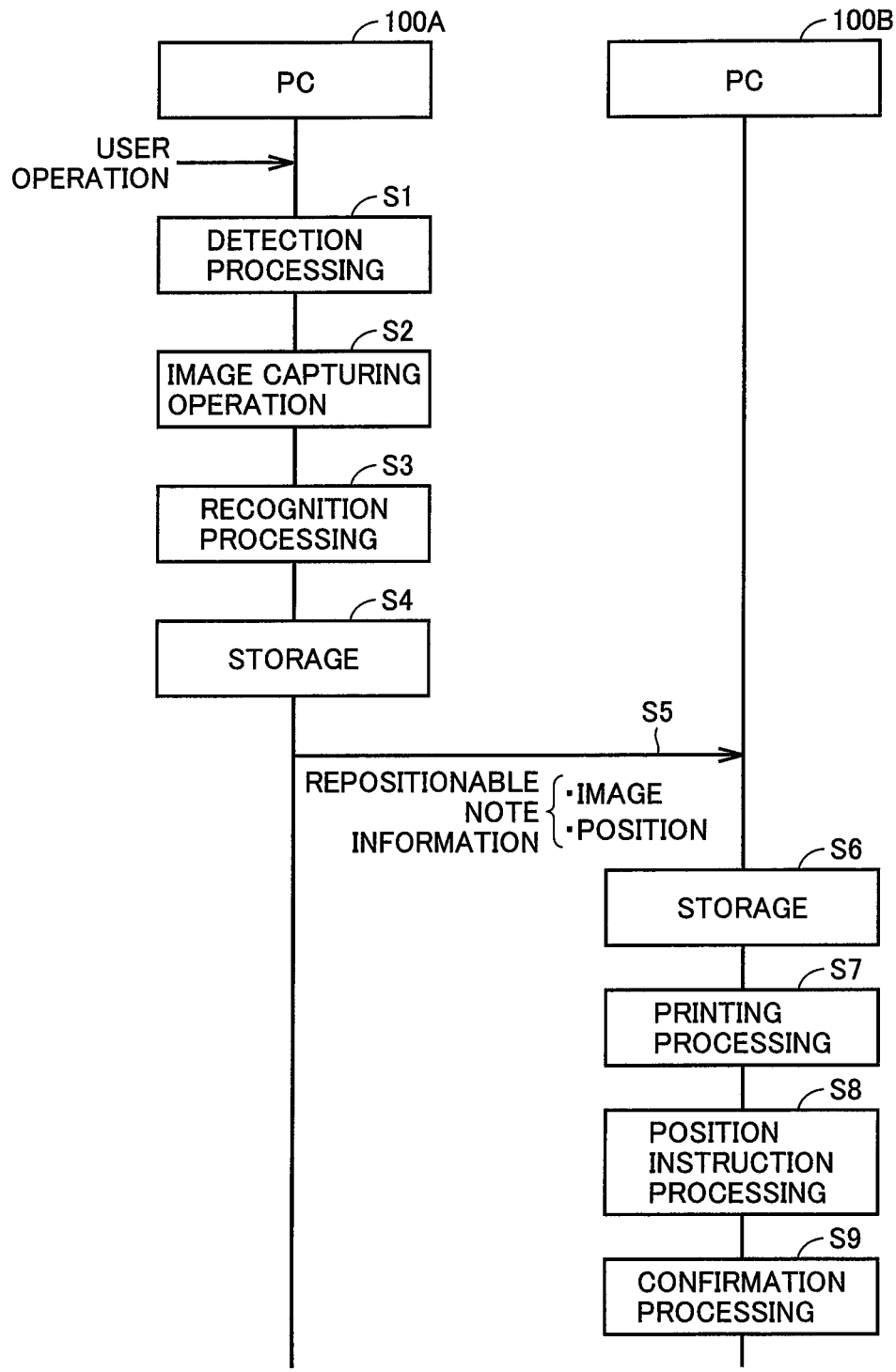
FIG. 5 illustrates an outline of operation in the support system.

FIG. 5 illustrates an outline of operation in the present support system. Referring to FIG. 5, PC 100A executes processing for detecting the above-described operation by a user at base A (step S1). As an example, PC 100A receives captured images from a camera 300A continuously or at short time intervals, and analyzes the images, thereby detecting that the user has touched white board WB1 or he/she is in close proximity thereto. That is, PC 100A detects a user operation on white board WB1.

Upon detection that the user has made an operation on white board WB1, PC 100A causes camera 400A to capture an image, and receives the captured image whose image capturing range includes white board WB1, from camera 400A (step S2). It is noted that PC 100A preferably causes camera 400A to capture an image after confirming that the user operation on white board WB1 has been completed based on the captured images from camera 300A. This prevents the user or part of the user's body (hand, etc.) from being reflected in a captured image.

PC 100A reads an immediately preceding captured image from a memory, and detects a difference from a current captured image. PC 100A then analyzes the difference to identify the repositionable note newly attached to white board WB1 (step S3). Here, the shape of a repositionable note to be used (color, pattern, etc.) shall be previously registered in PC 100A as an example. PC 100A can identify the repositionable note attached to white board WB1 by extracting its shape from the captured image. PC 100A conducts image analysis to specify written information and positional information of the repositionable note newly attached to white board WB1. PC 100A stores, in a memory, the captured image from camera 400 and specified information as repositionable note information (step S4).

It is noted that the processing of identifying a new repositionable note is not limited to the above-described processing. For example, PC 100A can also similarly identify a new repositionable note by conducting image analysis of captured images from camera 400A and identifying all of repositionable notes included in the captured images, and then detecting a difference from all the repositionable notes specified from an immediately preceding captured image. However, the load of image analysis can be reduced by previously detecting the difference from the immediately preceding captured image as described above.

In the case where there is a new repositionable note, that is, in the case where a repositionable note has been newly attached by the above-described user operation, PC 100A transmits the above-described repositionable note information, that is, written information and positional information of the new repositionable note, to remote PC 100B (step S5).

Upon receipt of the above-described repositionable note information from remote PC 100A, PC 100B stores the information in a memory (step S6). PC 100B then transmits the received written information to MFP 200B to instruct printing on a repositionable note previously defined (step S7). PC 100B also transmits the received information indicative of the attached position to projector 500B to instruct projection on white board WB2 at a position corresponding to the attached position as received, thereby presenting the attached position to users (step S8).

Preferably, in step S8, PC 100B previously stores the correspondence between the coordinates indicating a position on white board WB1 at base A and the coordinates indicating a position on white board WB2 at base B. PC 100B then converts a position (e.g., coordinates) indicated in the positional information based on the correspondence and transmits it to projector 500B to instruct corresponding projection on white board WB2.

A user can reproduce the state of the repositionable note on white board WB1 at base A by attaching a printed repositionable note at a position projected on white board WB2 by projector 500B. PC 100B executes processing for confirming that the user has finished attaching the repositionable note (step S9). When it is confirmed that a repositionable note whose contents are based on the repositionable note information from base A has been attached to a corresponding position and the attachment has been completed, PC 100B terminates projection by projector 500B to complete a series of operations.

It is noted that, in above-described step S8, PC 100B identifies the repositionable note attached by the user similarly to the above-described steps S1 to S3. PC 100B then makes a comparison with the repositionable note information stored in above-described step S6 to determine whether or not the repositionable note has been attached appropriately. That is, upon detection that the user has performed an operation on white board WB2 based on captured images with a camera 300B, PC 100B causes camera 400B to capture an image and receives input of the captured image whose image capturing range includes white board WB2, from camera 400B. PC 100B reads an immediately preceding captured image from a memory and detects the difference from the current captured image, thereby identifying the newly attached repositionable note. That is, PC 100B conducts image analysis to specify a written image on the newly attached repositionable note and its attached position, and obtains written information and positional information. PC 100B then compares that information with the repositionable note information on the repositionable note newly attached at base A stored in the memory in above-described step S6, and determines whether or not the repositionable note has been attached appropriately depending on whether or not the difference falls within an acceptable range set previously.

When it is determined that the repositionable note has not been attached appropriately, PC 100B assumes that the attaching operation has not yet been completed, and continues projection by projector 500B until the repositionable note is attached appropriately.

<Functional Configuration>

Figure 6:
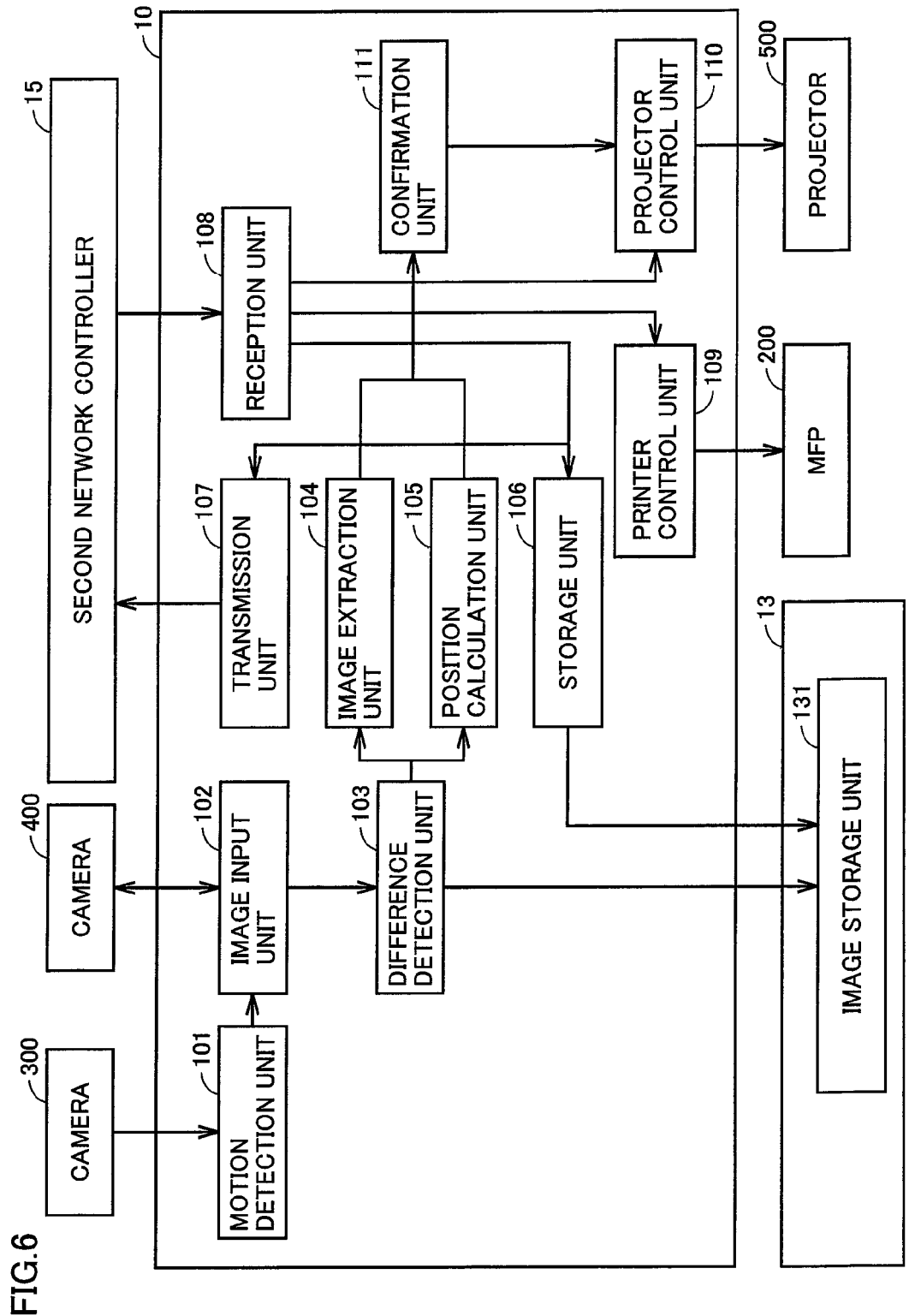
FIG. 6 is a block diagram showing a specific example of a functional configuration of PC.

FIG. 6 is a block diagram showing a specific example of a functional configuration of PC 100 for executing the above-described operations. Each function shown in FIG. 6 is achieved mainly by CPU 10 of PC 100 by CPU 10 reading a program stored in ROM 11 onto RAM 12 and executing the program. However, at least a part thereof may be achieved by an electrical circuit not shown, the hardware configuration shown in FIG. 2 or the like.

Referring to FIG. 6, an image storage unit 131 which is a storage area for storing captured images is included in HD 13, for example, as a memory. It is noted that the above-described repositionable note information may be stored in image storage unit 131 in addition to captured images.

Furthermore, referring to FIG. 6, CPU 10 includes a motion detection unit 101 for detecting a user operation on white board WB using captured images from camera 300, an image input unit 102 for outputting an image capturing instruction to camera 400 in accordance with the detection result, thereby receiving input of a captured image from camera 400, a difference detection unit 103 for reading an immediately preceding captured image as stored from image storage unit 131 for comparison, thereby detecting a difference, an image extraction unit 104 for extracting an image written on a newly attached repositionable note from the difference to obtain image information, a position calculation unit 105 for calculating an attached position (e.g., coordinates) of the newly attached repositionable note, a storage unit 106 for storing the captured image from camera 400 in image storage unit 131 and storing in image storage unit 131 the image information and the attached position as repositionable note information, a transmission unit 107 for transmitting the repositionable note information to a remote PC, a reception unit 108 for receiving repositionable note information from a remote PC, a printer control unit 109 for instructing MFP 200 to perform printing on a new repositionable note based on received written information, a projector control unit 110 for instructing projector 500 to project an image indicating the position on white board WB based on received positional information, and a confirmation unit 111 for confirming whether or not a repositionable note has been attached appropriately.

Storage unit 106 also stores received repositionable note information in image storage unit 131. Confirmation unit 111 compares repositionable note information obtained by analyzing captured images with camera 400 and the received repositionable note information, thereby confirming whether or not the repositionable note has been attached appropriately and the attaching operation has been completed. Then, in accordance with the confirmation result in confirmation unit 111, projector control unit 110 instructs termination of projection by the projector.

<Flow of Operation>

Figure 7:
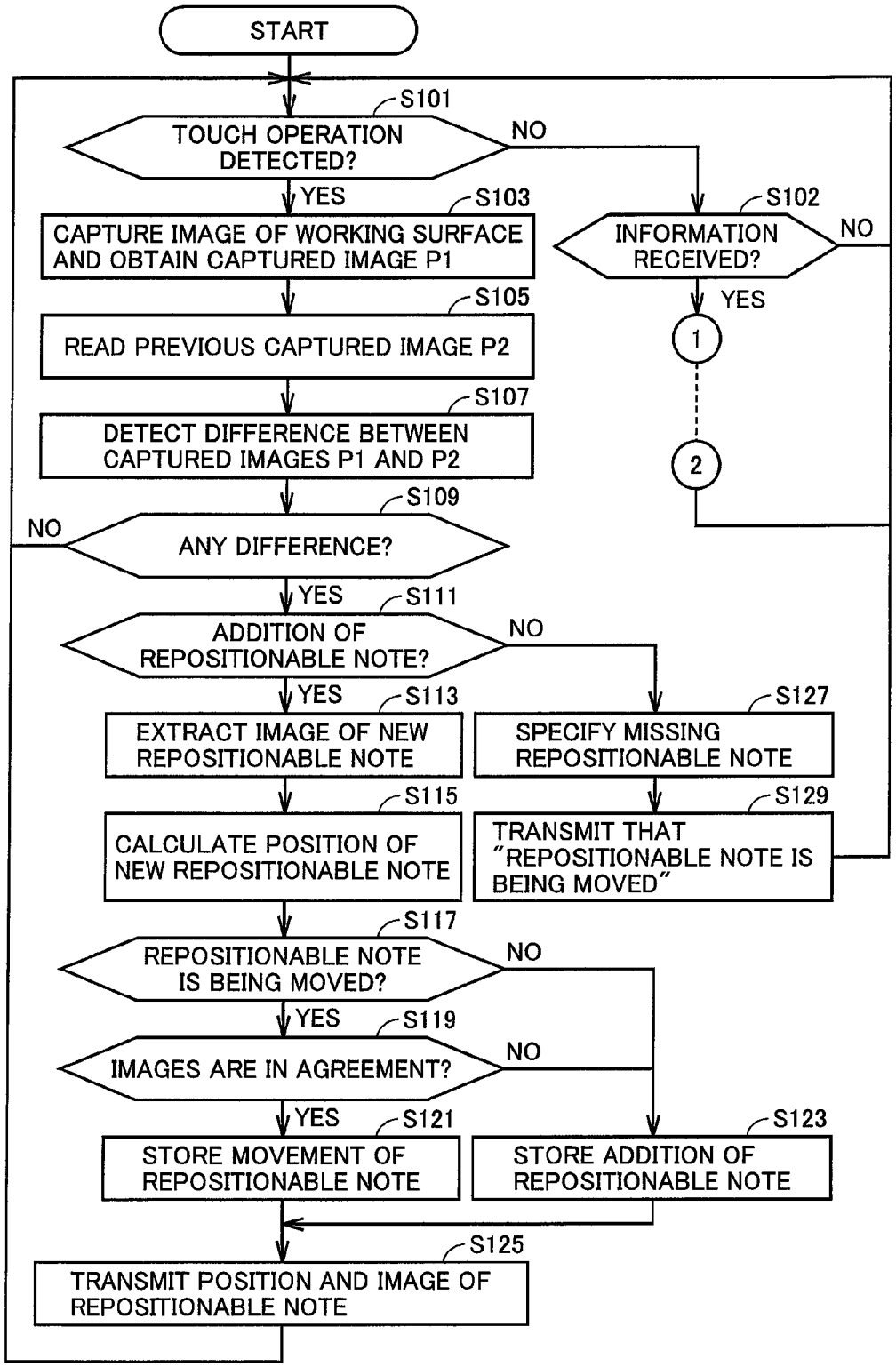
FIGS. 7 and 8 are flow charts illustrating the flow of an operation in PC.
Figure 8:
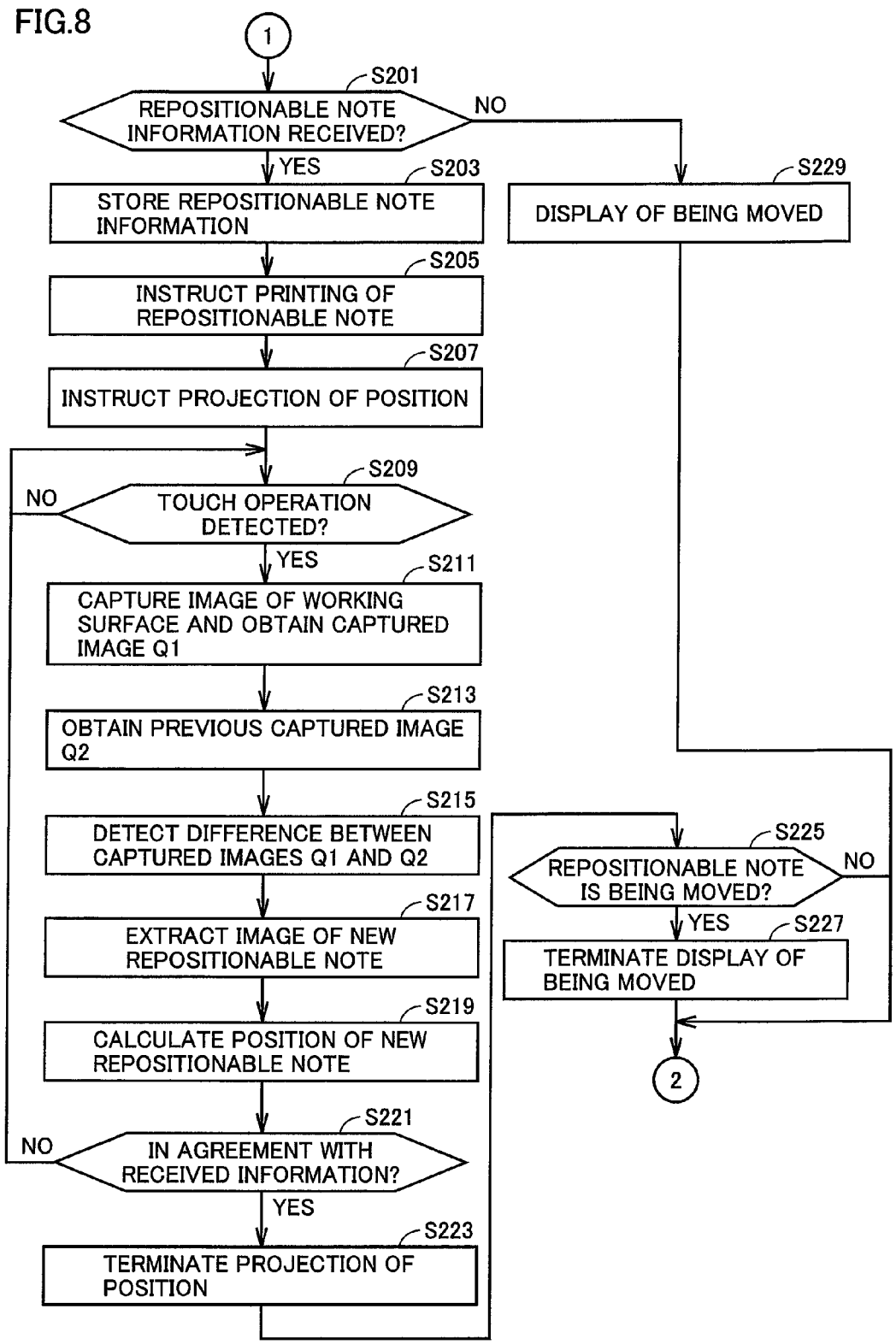

FIGS. 7 and 8 are flow charts illustrating the flow of an operation in PC 100. The operation illustrated in the flow charts of FIGS. 7 and 8 is achieved by CPU 10 of PC 100 reading a program stored in ROM 11 onto RAM 12 for execution so that each function of FIG. 6 is exerted.

That is, referring to FIG. 7, CPU 10 detects whether or not a user operation has been made on white board WB based on a captured image from camera 300 (step S101). In step S101, CPU 10 receives input of captured images (e.g., moving images) from camera 300 continuously or at short time intervals and performs image analysis, thereby detecting a characteristic portion of the user's body. As an example, CPU 10 detects the head from the captured images. In order to detect the head, CPU 10 detects a moving body from the captured images. CPU 10 determines that it is a head when its size, color and shape fall within prescribed ranges. When it is determined that the user's head is positioned within a previously defined distance (e.g., 50 cm) from the surface of white board WB, CPU 10 continues image analysis of that user assuming that the user is highly likely to perform an operation on white board WB.

Figure 9A:
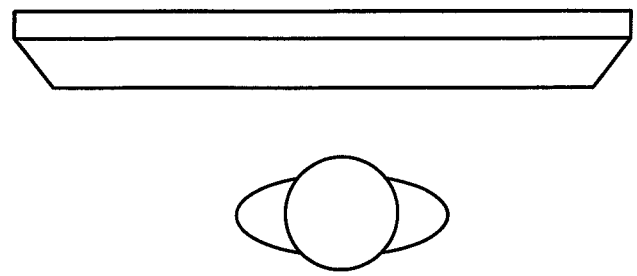
FIGS. 9A and 9B are explanatory drawings of a detection method in step S101 of FIG. 7.
Figure 9B:
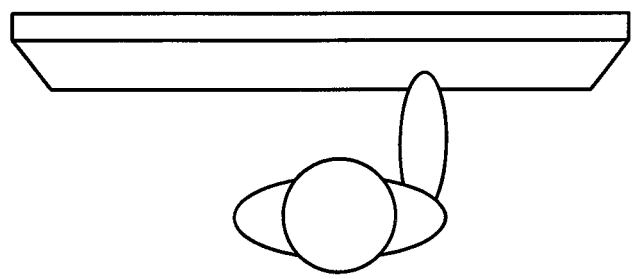

FIGS. 9A and 9B are explanatory drawings of a detection method in above-described step S101, schematically showing specific example captured images from camera 300. As an example, as shown in FIGS. 9A and 9B, camera 300 is placed above white board WB and slightly closer to the user side.

Referring to FIG. 9, having determined that the user's head is positioned within a previously defined distance from the surface of white board WB based on captured images with camera 300, CPU 10 then sequentially analyzes the captured images with camera 300 to detect the user's torso. Detection of the torso can be performed by detecting a moving body following the head.

Furthermore, CPU 10 sequentially analyzes the captured images from camera 300 to monitor the user's motion. When a part extending from the user's torso toward white board WB is detected as shown in FIG. 9B, CPU 10 monitors the distance between that part and white board WB. If the distance between that part and white board WB becomes equal to or smaller than the previously defined distance, it is detected that the user has touched white board WB, that is, an operation has been performed on white board WB.

It is noted that the method for detecting a user operation on white board WB is not limited to the above-described method. That is, it is not limited to detection by analyzing captured images from camera 300. For example, a user operation on white board WB may be detected by providing a sensor for detecting a touch on white board WB and causing CPU 10 to receive input of a sensor signal from the sensor.

Upon detection of a user operation on white board WB as described above (YES in step S101), CPU 10 instructs camera 400 to capture an image in an image capturing range including white board WB which is a working surface, and obtains a captured image P1 from camera 400 (step S103). CPU 10 reads an immediately preceding (previous) captured image P2 from a memory (step S105), and detects a difference between captured images P1 and P2 (step S107). When there is a difference between captured images P1 and P2 (YES in step S109) and further, when the difference is addition of a repositionable note (YES in step S111), CPU 10 extracts an image written on a newly attached repositionable note from the above-described difference to obtain written information (step S113). CPU 10 also calculates the attached position to obtain positional information (step S115).

When the repositionable note is being moved, that is, during an operation in which a user removes a repositionable note from white board WB and reattaches it to a new position (YES in step S117), CPU 10 compares written information of the repositionable note identified as a missing repositionable note by a previous operation (as will be described later) and written information of a new repositionable note. When they are in agreement, that is, when the written images are in agreement (YES in step S119), CPU 10 stores, in the memory, that the repositionable note previously identified as missing has been moved (step S121).

On the other hand, when the repositionable note is not currently being moved (NO in step S117), CPU 10 assumes the newly attached repositionable note as a new repositionable note, and stores its repositionable note information in the memory (step S123). It is noted that, either when the repositionable note is currently being moved or when the written information on the repositionable note identified as a missing repositionable note by the previous operation and the written information of a new repositionable note are not in agreement (NO in step S119), CPU 10 assumes the newly attached repositionable note as a new repositionable note, and stores its repositionable note information in the memory (step S123).

After the above operation, CPU 10 transmits the repositionable note information indicating the position of the repositionable note and a written image thereon to a remote PC (step S125), and returns to the first operation.

It is noted that when the difference between captured images P1 and P2 is not addition of a repositionable note, that is, when a repositionable note is missing (NO in step S111), CPU 10 specifies the missing repositionable note from the above-described difference (step S127), and stores it in the memory. Moreover, CPU 10 specifies that the repositionable note is currently being moved, and transmits information that specifies the repositionable note being moved to the remote PC together with information that the repositionable note is being moved (step S129).

The foregoing describes that CPU 10 analyzes captured images with camera 400 to specify a written image, and obtains written information. However, acquisition of written information is not limited to this method. As another example, an electrically-connected pen device may be used to write down an image on a repositionable note, and CPU 10 may specify the written image based on a signal from that pen device to obtain written information. Alternatively, as another example, when attaching a repositionable note, the repositionable note shall be scanned by MFP 200, and CPU 10 may receive input of a scanned image from MFP 200 to obtain written information. However, in these examples, the user operation of attaching the repositionable note is likely to be complicated. Therefore, preferably, CPU 10 performs image analysis as described above to specify a written image, and obtains written information. Then, a user's complicated operation can be eliminated as described above, and even when doing writing on a repositionable note or the like after attaching the repositionable note, new written information can be obtained.

When CPU 10 receives information from a remote PC (YES in step S102) rather than a user's operation on white board WB (NO in step S101), referring to FIG. 8, if that information is repositionable note information (YES in step S201), CPU 10 stores the repositionable note information in the memory (step S203) and passes written information to MFP 200 to instruct printing on a repositionable note (step S205). CPU 10 also instructs a position based on positional information to projector 500 to instruct projection of an image indicating the position (step S207).

Figure 10A:
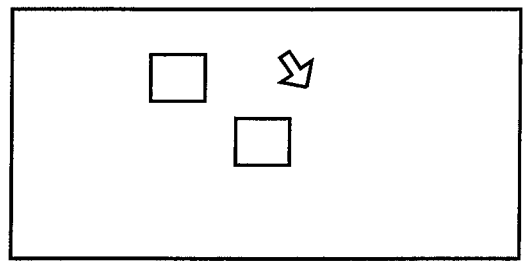
FIGS. 10A to 10C are schematic diagrams showing specific examples of a display method for indicating a position where a new repositionable note is to be attached.
Figure 10B:
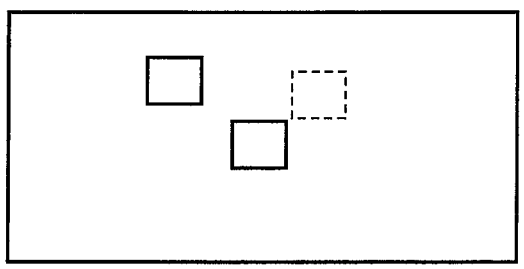
Figure 10C:
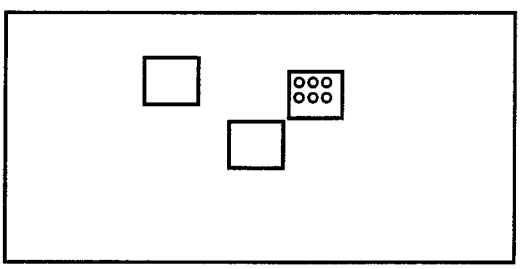

FIGS. 10A to 10C are schematic diagrams showing specific examples of a display method for indicating a position where a new repositionable note is to be attached by projector 500. As an example, projector 500 may present the attached position by displaying an arrow image directed to an instructed position as shown in FIG. 10A. As another example, projector 500 may present the attached position by displaying a mark having the same shape as a repositionable note at a position where the repositionable note is to be attached as shown in FIG. 10B. As still another example, projector 500 may present the attached position by displaying an image of a repositionable note to be newly attached at a position where the repositionable note is to be attached as shown in FIG. 10C. It is noted that, in the example of FIG. 10C, CPU 10 instructs a display position based on positional information to projector 500, and also instructs a display image based on written information.

Figure 11:
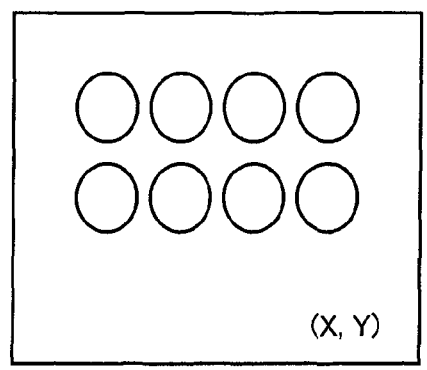
FIG. 11 is a schematic diagram illustrating another example of a method for presenting a position where a new repositionable note is to be attached.

In this example, the position where the repositionable note is to be attached shall be presented by projector 500 projecting an image indicating a position on white board WB, however, the method for presenting a position where a repositionable note is to be attached is not limited to this method. FIG. 11 is a schematic diagram illustrating another example of a method for presenting a position where a new repositionable note is to be attached. Referring to FIG. 11, as another example, when instructing MFP 200 to perform printing on a new repositionable note based on written information, CPU 10 may also instruct a position where the new repositionable note is to be attached based on positional information, and may instruct printing of that position (e.g., coordinates) where the new repositionable note is to be attached. As an example, as shown in FIG. 11, remotely written information is printed on a repositionable note to be newly attached, and the position where it is to be attached is also printed. Then, a user can attach the repositionable note in the same manner as attached at a remote site by attaching the repositionable note while checking the position where it is to be attached. It is noted that, in this case, CPU 10 may cause projector 500 to temporarily project coordinates on white board WB. Then, each user can find out the coordinate system.

Thereafter, CPU 10 executes processing for confirming whether or not the repositionable note instructed to be printed has been attached to the presented position. That is, CPU 10 detects whether or not a user operation has been performed on white board WB based on captured images from camera 300 (step S209). The operation here may be the same as the operation in above-described step S101. Upon detection of a user operation on white board WB (YES in step S209), CPU 10 instructs camera 400 to capture an image within an image capturing range including white board WB which is a working surface, and obtains a captured image Q1 from camera 400 (step S211). CPU 10 reads an immediately preceding (previous) captured image Q2 from the memory (step S213), and detects the difference between captured images Q1 and Q2 (step S215). CPU 10 extracts an image written on the newly attached repositionable note from the above-described difference to obtain written information (step S217). CPU 10 also calculates the attached position to obtain positional information (step S219). A series of operations having been performed so far are the same as those in above-described steps S103 to S115.

CPU 10 compares the repositionable note information on the new repositionable note with the received repositionable note information. As a result, when the written information and positional information on the new repositionable note fall within prescribed acceptable ranges with respect to those of the received repositionable note information (YES in step S221), CPU 10 assumes that the repositionable note has been attached appropriately, and terminates presentation of the position where the repositionable note is to be attached with projector 500 (step S223). Otherwise (NO in step S221), CPU 10 continues monitoring attachment by a user while continuing presentation of the position where the repositionable note is to be attached with projector 500 until the repositionable note is attached appropriately.

It is noted that when the repositionable note is being moved (YES in step S225), CPU 10 terminates display with projector 500 indicating that the repositionable note is being moved, which will be described later (step S227), and returns the operation to the beginning.

On the other hand, when the information received from a remote PC is not repositionable note information (NO in step S201), that is, when it is the information transmitted in above-described step S129 indicating that the repositionable note is being moved, CPU 10, assuming that the repositionable note is being moved, causes projector 500 to make a display indicating that state (step S229), and returns the operation to the beginning.

Figure 12A:
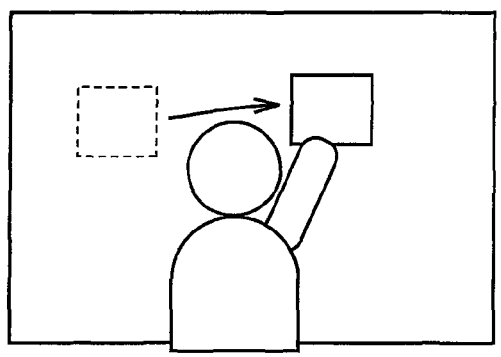
FIGS. 12A and 12B are explanatory drawings of specific examples of a display in step S229 of FIG. 8 indicating that a repositionable note is being moved.
Figure 12B:
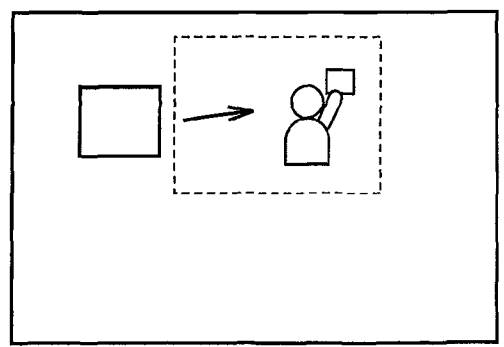

FIGS. 12A and 12B are explanatory drawings of specific examples of a display in above-described step S229 indicating that a repositionable note is being moved. As an example, projector 500 displays on white board WB an avatar of a user having a repositionable note to be moved in his/her hand. The "avatar" refers to an image that represents the user who has a repositionable note in his/her hand, and a captured image of the user having the repositionable note to be moved in his/her hand formed into a predetermined size is preferably used. A previously stored image may be used instead.

That is, as an example, when a user removes an already attached repositionable note from white board WB1 at base A as shown in FIG. 12A, CPU 10 detects that the repositionable note is missing and obtains a captured image at that time. CPU 10 transmits the captured image to remote PC 100B together with information that the repositionable note is being moved.

Upon receipt of that information, CPU 10 of PC 100B at base B scales down the received captured image to a predetermined size as an example, and passes the reduced image to projector 500B to cause projector 500B to project it in proximity to the repositionable note to be moved as shown in FIG. 12B.

Then, a display indicating that the repositionable note is being moved is made at base B at the time when it is detected that an already attached repositionable note is missing at base A. At that time, with an avatar being displayed as shown in FIG. 12B, a user at base B can find out intuitively that the repositionable note is being moved. Furthermore, as described above, it can also be found out at base B who is going to move the repositionable note with a captured image including a user who is actually moving the repositionable note being used as the avatar. When exchanging ideas, an idea creation activity can be conducted sufficiently by recognizing that a repositionable note is being moved, but smoother communications can be achieved in an idea creation activity by recognizing who is moving the repositionable note.

Effects of Embodiment

By the above operation being performed in PC 100 provided at each base, the state of a repositionable note at certain base A is reflected generally in real time on remote base B. An idea creation activity by a plurality of persons at a plurality of remote bases is thus performed smoothly. That is, users at the respective bases can share the working state as if they are participating in an idea creation activity at the same base.

<Variation 1>

It is noted that, since the above-described operation is performed in PC 100 provided at each base, corresponding repositionable notes at the respective bases may be subjected to different operations at the respective bases. Such a state will hereinafter be referred to as a competitive state as well.

When a certain repositionable note falls into a competitive state, the present support system presents that at each base, thereby reducing confusion among users at different bases. Specifically, when a missing repositionable note has been specified from the difference between captured images P1 and P2, and if information indicating that the repositionable note is being moved has been received from remote PC 100, CPU 10 determines that the repositionable note is in a competitive state. In this case, CPU 10 causes a previously-defined image showing that the repositionable note is in a competitive state to be displayed in proximity to that repositionable note, and transmits information indicating that the repositionable note is in a competitive state to remote PC 100. When the information indicating that a repositionable note being moved is in a competitive state is received from remote PC 100, CPU 10 causes a previously-defined image showing that the repositionable note is in a competitive state to be displayed in proximity to that repositionable note. Example images showing that the repositionable note is in a competitive state include the previously-mentioned avatar.

Because the present support system performs such a display, users at another base or users at the both bases can readily recognize that a repositionable note is in a competitive state, and can perform an operation of avoiding the competitive state.

However, even if it is displayed that a repositionable note is in a competitive state, none of users at the respective bases may perform the operation of avoiding the competitive state. In this case, CPU 10 may cause a destination of the repositionable note at a remote base to be displayed on white board WB in accordance with repositionable note information received from remote PC 100. Then, users at the respective bases can check the position of the repositionable note at their own bases with an actual repositionable note, and can also check the position of a repositionable note at a remote base by projection with projector 500

<Variation 2>

It is noted that the foregoing describes specification of a position where a repositionable note is to be attached on a working surface as a position where a repositionable note is to be attached, namely, two-dimensional processing. However, in the present support system, the position where a repositionable note is to be attached may be processed three-dimensionally. For example, a movement of a repositionable note in a user operation, such as removing a repositionable note attached to the working surface and holding it in his/her hand or attaching it to a different working surface, can be reflected. For example, PC 100 may specify the position of each repositionable note by three-dimensional coordinates assuming the upper left corner of white board WB as the starting point (0, 0, 0), the direction parallel to white board WB as an X-axis direction, the downward direction as a Y-axis direction, and the direction normal to white board WB as a Z-axis direction.

Then, the present support system can specify the movement of each repositionable note in more detail, and can transfer the movement in detail to a remote site. Accordingly, users at the respective bases can share the working state in more detail.

<Variation 3>

As previously described, the control device is not limited to PC, but may be any other device, or may be included in MFP 200. Therefore, a program for causing CPU of these devices which are general-purpose devices to execute the above-described operations can also be provided. Such a program can be recorded on a computer-readable recording medium, such as a flexible disk attached to a computer built in these devices, a CD-ROM (Compact Disk-Read Only Memory), a ROM, a RAM, a memory card, or the like, and can be offered as a program product. Alternatively, the program can be offered as recorded on a recording medium such as a hard disk built in a computer. Still alternatively, the program can also be offered by downloading through a network.

It is noted that the program according to the present invention may cause the process to be executed by invoking necessary modules among program modules offered as part of an operating system (OS) of a computer with a predetermined timing in a predetermined sequence. In that case, the program itself does not include the above-described modules, but the process is executed in cooperation with the OS. Such a program not including modules may also be covered by the program according to the present invention.

Moreover, the program according to the present invention may be offered as incorporated into part of another program. Also in such a case, the program itself does not include the modules included in the above-described other program, and the process is executed in cooperation with the other program. Such a program incorporated into another program may also be covered by the program according to the present invention.

An offered program product is installed in a program storage unit, such as a hard disk, and is executed. It is noted that the program product includes a program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A system for supporting an idea creation activity, comprising:
   a printing device; and
   a control device electrically connected to said printing device,
   said control device including:
      a specification unit configured to specify written information on a first card newly placed on a first workspace and a position where said first card is placed,
      a storage unit configured to store said written information on said first card as specified and the position where said first card is placed as specified, as card information,
      a control unit configured to cause said printing device to print a second card based on said written information as specified, and
      a presentation unit configured to present a position where said second card is to be placed on a second workspace based on the position where said first card is placed as specified,
   wherein said presentation unit causes a display device connected to said control device to make a display showing the position where said second card is to be placed on the second workspace, based on the position where said first card is placed,
   wherein said control device further includes a confirmation unit configured to confirm, after presentation of the position where said second card is to be placed, that placement of said second card has been completed by comparing written information on said second card placed on said second workspace and the position where said second card is placed with written information on said first card and the position where said first card is placed, and
   wherein when it is confirmed that placement of said second card had been completed, said presentation unit causes said display device to terminate the display showing the position where said second card is to be placed.

2. The system according to claim 1, wherein:
   said control device further includes a detection unit configured to detect a user operation on said first workspace, and
   said specification unit specifies said written information and said position where said first card is placed when it is detected that the user operation has been performed on said first workspace.

3. The system according to claim 1, wherein:
   said control device further includes an image input unit configured to receive input of a captured image including said first workspace, and
   said specification unit specifies said written information and said position where said first card is placed by analyzing said captured image.

4. The system according to claim 1, wherein said specification unit includes an extraction unit configured to extract said first card by comparing said card information and immediately preceding card information on said first workspace.

5. The system according to claim 1, wherein said presentation unit causes said printing device to print the position where said second card is to be placed based on the position where said first card is placed.

6. The system according to claim 1, wherein:
   said specification unit specifies a third card removed from said first workspace, and
   said presentation unit presents that a fourth card corresponding to said third card in said second workspace is to be operated.

7. The system according to claim 6, wherein when said specification unit specifies that said third card has been removed from said first workspace and said fourth card has been removed from said second workspace, said presentation unit presents that said third card is also to be operated on said first workspace.

8. The system according to claim 6, wherein when said specification unit specifies that said third card has been removed from said first workspace, and when the written information on said first card is in agreement with written information on said third card, said storage unit stores, in a memory, that said third card has been moved to the position of said first card.

9. A control device for controlling support of an idea creation activity, comprising:
   a specification unit configured to specify written information on a first card newly placed on a first workspace and a position where said first card is placed;
   a storage unit configured to store said written information on said first card as specified and the position where said first card is placed as specified, as card information;
   a control unit configured to cause a printing device connected to said control device to print a second card based on said written information as specified; and
   a presentation unit configured to present a position where said second card is to be placed on a second workspace based on the position where said first card is placed as specified,
   wherein said presentation unit causes a display device connected to said control device to make a display showing the position where said second card is to be placed on the second workspace, based on the position where said first card is placed,
   wherein said control device further includes a confirmation unit configured to confirm, after presentation of the position where said second card is to be placed, that placement of said second card has been completed by comparing written information on said second card placed on said second workspace and the position where said second card is placed with written information on said first card and the position where said first card is placed, and
   wherein when it is confirmed that placement of said second card had been completed, said presentation unit causes said display device to terminate the display showing the position where said second card is to be placed.

10. An image forming apparatus including the control device as defined in claim 9.

11. A non-transitory computer-readable storage medium storing a program for causing a controller of a computer to execute processing for supporting an idea creation activity, said program causing said controller to perform operations including:
   specifying written information on a first card newly placed on a first workspace and a position where said first card is placed;
   storing said written information on said first card as specified and the position where said first card is placed as specified, as card information;
   instructing a printing device connected to said computer to print a second card based on said written information as specified;
   presenting a position where said second card is to be placed on a second workspace based on the position where said first card is placed as specified;
   causing a display device to make a display showing the position where said second card is to be placed on the second workspace, based on the position where said first card is placed,
   confirming, after presentation of the position where said second card is to be placed, that placement of said second card has been completed by comparing written information on said second card placed on said second workspace and the position where said second card is placed with written information on said first card and the position where said first card is placed, and
   when it is confirmed that placement of said second card had been completed, causing said display device to terminate the display showing the position where said second card is to be placed.

12. A method for supporting an idea creation activity in a control device, comprising:
   specifying written information on a first card newly placed on a first workspace and a position where said first card is placed;
   storing said written information on said first card as specified and the position where said first card is placed as specified, as card information;
   instructing a printing device connected to said control device to print a second card based on said written information as specified; and
   presenting a position where said second card is to be placed on a second workspace based on the position where said first card is placed as specified;
   causing a display device to make a display showing the position where said second card is to be placed on the second workspace, based on the position where said first card is placed,
   confirming, after presentation of the position where said second card is to be placed, that placement of said second card has been completed by comparing written information on said second card placed on said second workspace and the position where said second card is placed with written information on said first card and the position where said first card is placed, and
   when it is confirmed that placement of said second card had been completed, causing said display device to terminate the display showing the position where said second card is to be placed.

13. A system for supporting an idea creation activity, comprising:
   a printing device; and
   a control device electrically connected to said printing device,
   said control device including:
      a specification unit configured to specify written information on a first card newly placed on a first workspace and a position where said first card is placed,
      a storage unit configured to store said written information on said first card as specified and the position where said first card is placed as specified, as card information,
      a control unit configured to cause said printing device to print a second card based on said written information as specified, and
      a presentation unit configured to present a position where said second card is to be placed on a second workspace based on the position where said first card is placed as specified,
      wherein said specification unit is further configured to specify a third card removed from said first workspace, and
      wherein said presentation unit is further configured to present that a fourth card corresponding to said third card in said second workspace is to be operated.

14. The system according to claim 13, wherein when said specification unit specifies that said third card has been removed from said first workspace and said fourth card has been removed from said second workspace, said presentation unit presents that said third card is also to be operated on said first workspace.

15. The system according to claim 13, wherein when said specification unit specifies that said third card has been removed from said first workspace, and when the written information on said first card is in agreement with written information on said third card, said storage unit stores, in a memory, that said third card has been moved to the position of said first card.

16. The control device according to claim 13, wherein when said specification unit specifies that said third card has been removed from said first workspace, and when the written information on said first card is in agreement with written information on said third card, said storage unit stores, in a memory, that said third card has been moved to the position of said first card.

17. A control device for controlling support of an idea creation activity, comprising:
   a specification unit configured to specify written information on a first card newly placed on a first workspace and a position where said first card is placed;
   a storage unit configured to store said written information on said first card as specified and the position where said first card is placed as specified, as card information;
   a control unit configured to cause a printing device connected to said control device to print a second card based on said written information as specified; and
   a presentation unit configured to present a position where said second card is to be placed on a second workspace based on the position where said first card is placed as specified,
   wherein said specification unit is further configured to specify a third card removed from said first workspace, and
   said presentation unit is further configured to present that a fourth card corresponding to said third card in said second workspace is to be operated.

18. The control device according to claim 17, wherein when said specification unit specifies that said third card has been removed from said first workspace and said fourth card has been removed from said second workspace, said presentation unit presents that said third card is also to be operated on said first workspace.

19. A non-transitory computer-readable storage medium storing a program for causing a controller of a computer to execute processing for supporting an idea creation activity, said program causing said controller to perform operations including:
- specifying written information on a first card newly placed on a first workspace and a position where said first card is placed;
- storing said written information on said first card as specified and the position where said first card is placed as specified, as card information;
- instructing a printing device connected to said computer to print a second card based on said written information as specified;
- presenting a position where said second card is to be placed on a second workspace based on the position where said first card is placed as specified;
- specifying a third card removed from said first workspace; and
- presenting that a fourth card corresponding to said third card in said second workspace is to be operated.

20. The non-transitory computer-readable storage medium according to claim 19, wherein when it is specified that said third card has been removed from said first workspace and said fourth card has been removed from said second workspace, said program causes said controller to present that said third card is also to be operated on said first workspace.

21. The non-transitory computer-readable storage medium according to claim 19, wherein when it is specified that said third card has been removed from said first workspace, and when the written information on said first card is in agreement with written information on said third card, said program causes said controller to store, in a memory, that said third card has been moved to the position of said first card.

22. The method according to claim 19, further comprising:
- when it is specified that said third card has been removed from said first workspace and said fourth card has been removed from said second workspace, presenting that said third card is also to be operated on said first workspace.

23. The method according to claim 19, further comprising:
- when it is specified that said third card has been removed from said first workspace, and when the written information on said first card is in agreement with written information on said third card, storing in a memory that said third card has been moved to the position of said first card.

24. A method for supporting an idea creation activity in a control device, comprising:
- specifying written information on a first card newly placed on a first workspace and a position where said first card is placed;
- storing said written information on said first card as specified and the position where said first card is placed as specified, as card information;
- instructing a printing device connected to said control device to print a second card based on said written information as specified;
- presenting a position where said second card is to be placed on a second workspace based on the position where said first card is placed as specified; specifying a third card removed from said first workspace; and
- presenting that a fourth card corresponding to said third card in said second workspace is to be operated.

* * * * *